Patented Feb. 21, 1950

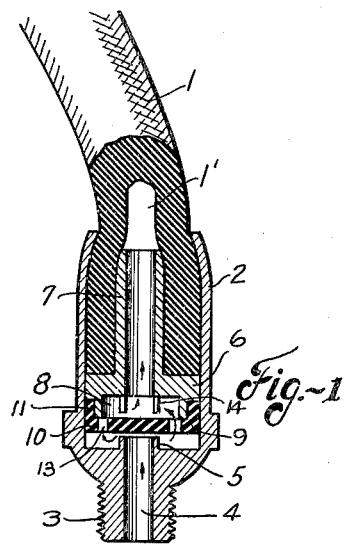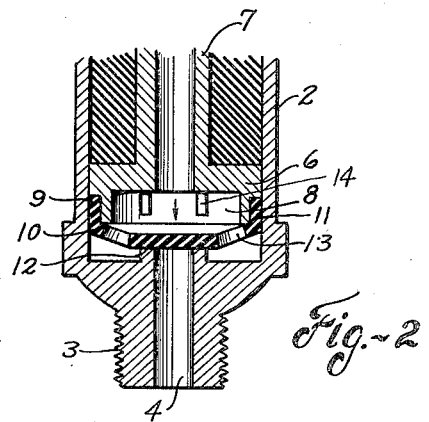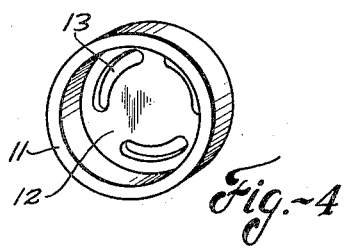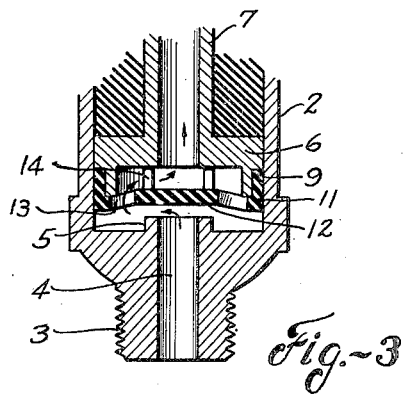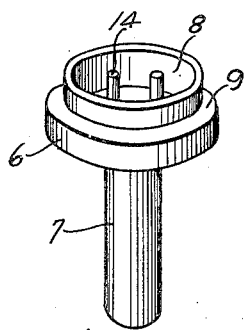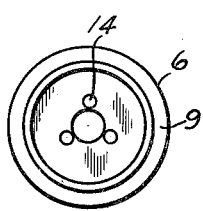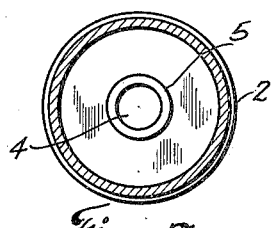

2,497,906

UNITED STATES PATENT OFFICE 2,497,906

VALVED HOSE CONNECTION

George E. Peters and Linus E. Russell, Springfield, Ohio, assignors to Peters & Russell, Inc., Springfield, Ohio, a corporation of Ohio Application October 20, 1944, Serial No. 559,538

2 Claims. (Cl. 251—119)

This invention pertains to valves, and more particularly to check valves. It is herein illustrated embodied in a valved hose coupling, but is not necessarily limited thereto.

The object of the invention is to improve the construction as well as the means and mode of operation of such valves, whereby they may not only be economically manufactured, but will be more efficient in use, automatic in action, uniform in operation, of compact form, having minimum operating parts, and unlikely to get out of repair.

A further object of the invention is to provide an improved combined hose or pipe coupling and a check valve embodied therein.

A further object of the invention is to provide a flexible diaphragm form of fluctuating valve, and a mounting therefor so constructed and adapted that upon movement in one direction under influence of fluid pressure the flexible valve will operate to close a fluid passage, while its movement in the opposite direction under reverse fluid pressure influence will be restricted or limited to maintain such passage open.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein the preferred but not necessarily the only form of embodiment of the invention is illustrated, Fig. 1 is a longitudinal sectional view of a hose coupling embodying the present invention, the valve being in a normal or intermediate position without subjection to fluid pressure in either direction.

Fig. 2 is an enlarged sectional detail view, wherein the valve is shown seated under influence of downward fluid pressure to close the valved passage.

Fig. 3 is a sectional view similar to that of Fig. 2, wherein the valve element is shown in open position under influence of upwardly directed fluid pressure.

Fig. 4 is a perspective view of the flexible diaphragm valve removed from the assembly.

Fig. 5 is a perspective view of the valve mounting.

Fig. 6 is a plan view thereof.

Fig. 7 is a plan view of the outer fitting.

Like parts are indicated by similar characters of reference throughout the several views.

The valved coupling illustrated is especially adapted for attaching a flexible hose, but might be a pipe coupling or valved unit for insertion in a pipe or hose other than as a coupling unit.

In the drawing 1 is a section of flexible hose, to the end of which is secured by contraction a ferrule or sleeve 2, having a screw threaded nipple 3 through which extends a bore or passage 4. Interiorly of the ferrule or sleeve 2 surrounding the inner end of the bore 4 is a raised annular valve seat 5.

Enclosed in the ferrule or sleeve 2 is a mounting head 6 for the valve element, having a tubular stem 7 which is thrust tightly within the passage 1' of the hose 1.

The mounting head 6 is recessed to form an interior chamber 8 and is peripherally rabbeted at 9. Positioned over the open side of the recessed head 6 and seated in the marginal rabbet 9 is a flexible cap 10, preferably of rubber, or rubber substitute, having a marginal rim 11 which engages in the rabbet 9, and a diaphragm having an imperforate central area or disc 12 about which are disposed a series of circumferentially arranged slots 13. Within the chamber 8 is a series of upstanding studs 14 which limit the approach of the imperforate area of the cap 10 toward the bottom of the recess.

The mounting 6—7 being engaged with the hose 1 by thrusting the tubular stem within the open end of the hose, and the end of the connected hose and mounting head 6 are then inserted within the sleeve 2, wherein the head 6 has a sliding fit until the flexible valve diaphragm occupies a position in proximate relation with the interior bottom of the sleeve fitting 2 and the valve seat 5. In this position the central disc 12 of the cap is in spaced relation with the valve seat 5. When fluid under pressure flows through the bore 4 from the outer end of the nipple 3 and thence past the valve seat 5, its pressure against the imperforate central area 12 of the valve member 10 deflects the latter until it is limited by engagement against the ends of the projecting studs 14 within the chamber 8, as is shown in Fig. 3. The air continues to flow through the bore 4 past the valve seat 5 and thence through the slots 13 of the flexible valve cap 10 into the chamber 8 and thence through the bore of the tubular stem 7 into the hose 1. When, however, the flow of fluid under pressure is reversed and flows through the hose 1 toward the valve member, the latter is flexed into contact with the valve seat 5, as is illustrated in Fig. 2, thereby closing the bore 4 and preventing escape of the fluid under pressure therethrough.

The check valve thus described may be made in various sizes according to the conditions of its use. It readily lends itself especially to small size assemblies. One use to which it has been extensively applied, and for which it is found well adapted, is in the manufacture of hand operated air pumps, such as used for inflating pneumatic tires, of which the hose 1 comprises the outlet or discharge conduit.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A valved hose coupling, including a ferrule to be contracted at one end around the end of a hose and having at its other end a port for passage of fluid under pressure, a valve seat surrounding the port, a peripherally rabbeted and recessed head located within the ferrule in spaced relation with the valve seat, a tubular stem on said head to be projected interiorly of the hose end, the bore of which communicates with the recess of said head, a flexible cap seated in the peripheral rabbet of the head and extending across the recess thereon in spaced relation with the valve seat, a by-pass port in the cap in laterally offset relation with the port and bore of the tubular stem of said head, a central imperforate area of the flexible cap forming a valve, subject to fluid pressure through the tubular stem by which it is deflected into contact relation with the valve seat to close the port, and alternately subject to fluid pressure through the port to deflect the central imperforate area of said cap away from the valve seat, and an upstanding stud within the recess of the head limiting the deflection of the said imperforate central area of the cap into the recess of the head.

2. A valved hose coupling, including a ferrule to receive a hose end and having a port therein for passage of fluid under pressure, a valve seat surrounding the port, a head disposed transversely within the ferrule between the hose end of the ferrule and the valve seat in spaced relation with the latter, a tubular stem projecting from the head within the interior of the hose end of the ferrule, and communicating with the space between the head and the valve seat, a flexible diaphragm transversely disposed within the intervening space between the head and valve seat having a by-pass opening in laterally offset relation with the port and tubular stem, and subject to fluid under pressure admitted to said space alternately through the port and through the tubular stem, a central imperforate area of the diaphragm forming a valve, and deflected against the inherent resiliency of the diaphragm into contact with the valve seat to close the port by fluid pressure admitted through the stem, and deflected away from the valve seat against the inherent resiliency of the diaphragm by fluid pressure admitted through the port, and a stop carried by the head limiting the approach of the valve area of the diaphragm to prevent closure of the tubular stem thereby.

GEORGE E. PETERS.
LINUS E. RUSSELL.

REFERENCES CITED

The following references are of record in the file of this patent:

UNITED STATES PATENTS

| Number | Name | Date |
|---|---|---|
| 208,379 | Downey | Sept. 24, 1878 |
| 2,028,316 | Brunner | Jan. 21, 1936 |
| 2,082,606 | Woodbridge | June 1, 1937 |
| 2,223,994 | Johnson | Dec. 3, 1940 |
| 2,346,223 | Lyon | Apr. 11, 1944 |
| 2,349,435 | Keefe | May 23, 1944 |

FOREIGN PATENTS

| Number | Country | Date |
|---|---|---|
| 600,854 | Germany | Aug. 8, 1934 |